US007366155B1

(12) United States Patent
Leppisaari et al.

(10) Patent No.: US 7,366,155 B1
(45) Date of Patent: Apr. 29, 2008

(54) ALLOCATION OF RADIO RESOURCES FROM A NETWORK IN A PACKET SWITCHED DATA TRANSMISSION SYSTEM

(75) Inventors: Arto Leppisaari, Tampere (FI); Juha M Kalliokulju, Vesilahti (FI)

(73) Assignee: Nokia Corporation, Espoo (FI)

( * ) Notice: Subject to any disclaimer, the term of this patent is extended or adjusted under 35 U.S.C. 154(b) by 574 days.

(21) Appl. No.: 09/661,950

(22) Filed: Sep. 14, 2000

(30) Foreign Application Priority Data

Sep. 16, 1999 (FI) .................................. 19991976

(51) Int. Cl.
H04B 7/212 (2006.01)
(52) U.S. Cl. ...................... 370/348; 370/329; 370/443
(58) Field of Classification Search ................ 370/341, 370/349, 395.3, 395.2, 395.21, 455, 230, 370/231, 322; 455/426, 435
See application file for complete search history.

(56) References Cited

U.S. PATENT DOCUMENTS

| 5,708,655 | A | * | 1/1998 | Toth et al. ................... 370/313 |
| 5,719,859 | A | * | 2/1998 | Kobayashi et al. ......... 370/347 |
| 5,799,251 | A | * | 8/1998 | Paavonen ................... 455/517 |
| 5,802,465 | A | * | 9/1998 | Hamalainen et al. ....... 455/403 |
| 5,878,036 | A | * | 3/1999 | Spartz et al. ............... 370/335 |
| 5,940,756 | A | * | 8/1999 | Sibecas et al. ............ 455/426.1 |
| 6,175,737 | B1 | * | 1/2001 | Kao ............................. 455/447 |
| 6,256,301 | B1 | * | 7/2001 | Tiedemann et al. ......... 370/342 |
| 6,324,279 | B1 | * | 11/2001 | Kalmanek et al. .......... 379/229 |
| 6,374,112 | B1 | * | 4/2002 | Widegren et al. ........ 455/452.2 |
| 6,400,695 | B1 | * | 6/2002 | Chuah et al. ............... 370/310 |
| 6,400,954 | B1 | * | 6/2002 | Khan et al. ................. 455/450 |
| 6,490,271 | B1 | * | 12/2002 | Erjanne ...................... 370/347 |

(Continued)

FOREIGN PATENT DOCUMENTS

| EP | 0413488 A2 | 2/1991 |
| WO | WO 99/21313 | 4/1999 |
| WO | WO 00/33498 | 6/2000 |
| WO | WO 00/42806 | 7/2000 |

OTHER PUBLICATIONS

"Digital Cellular Telecommunications System (Phase 2+)", General Packet Radio Service (GPRS), Overall Description Of The GPRS Radio Interface Stage 2, GSM 03.64, Ver. 6.3.0, 1997.

(Continued)

Primary Examiner—Chi Pham
Assistant Examiner—Kevin Mew
(74) Attorney, Agent, or Firm—Perman & Green, LLP

(57) ABSTRACT

A method for allocating radio resources in a packet-switched data transmission system in two phases, in which system a terminal is capable of communicating with a network over a radio interface by using packet transfer mode, including: generating and sending from the terminal to the network a first radio resource request for allocating a radio resource for transmission of a second radio resource request; generating and sending from the terminal to the network, after the network allocates the requested radio resource, the second radio resource request for allocating a radio resource to the terminal for packet-switched communication, wherein the second radio resource request comprises an express indication on whether the radio resource is requested for a real-time service, and wherein the radio resource request is implemented by a protocol layer which defines procedures that enable radio resources to be allocated and divided among multiple users.

15 Claims, 5 Drawing Sheets

U.S. PATENT DOCUMENTS

| | | | |
|---|---|---|---|
| 6,501,741 B1 * | 12/2002 | Mikkonen et al. | 370/310 |
| 6,532,225 B1 * | 3/2003 | Chang et al. | 370/341 |
| 6,542,739 B1 * | 4/2003 | Garner | 455/427 |
| 6,570,851 B1 * | 5/2003 | Koskelainen et al. | 370/231 |
| 6,587,433 B1 * | 7/2003 | Borella et al. | 370/230 |
| 6,587,457 B1 * | 7/2003 | Mikkonen | 370/356 |
| 6,608,832 B2 * | 8/2003 | Forslow | 370/353 |
| 6,693,892 B1 * | 2/2004 | Rinne et al. | 370/348 |
| 6,937,566 B1 * | 8/2005 | Forslow | 370/231 |
| 7,009,994 B2 * | 3/2006 | Bahl | 370/458 |

OTHER PUBLICATIONS

"Digital Cellular Telecommunications System (Phase 2+)", General Packet Radio Service (GPRS), Mobile Station (MS)—Base Station System (BSS) Interface, Radio Link Control / Medium Access Control (RLC/MAC) Protocol, GSM 04.60, Ver. 6.4.0, 1997. Corresponds to Finnish Patent Application No. FI 982577.

GSM 04.60 version 6.3.1., 1997, pp. 14-58.

* cited by examiner

| 1 | 1 | 0 | 1 | 0 | 1 | X | X | X | X | X |

| 0 | 1 | 1 | 0 | 1 | X | X | X |

ALLOCATION OF RADIO RESOURCES FROM A NETWORK IN A PACKET SWITCHED DATA TRANSMISSION SYSTEM

FIELD OF THE INVENTION

The present invention relates to packet switched data transmission systems, such as GPRS (General Packet Radio Service). In particular, the invention relates to the allocation of radio resources in the GPRS system. Although in the following, in the description part, the GPRS system is continuously used as an example of a packet switched data transmission system, the invention explained in this description part may also be implemented as for its essential parts in other packet switched data transmission systems, such as IS-136 TDMA, CDMA and a system that is being developed in North America, currently known by the name of IS-136HS.

BACKGROUND OF THE INVENTION

In packet switched data transmission, the data to be transmitted in a network is divided into small data units, called packets. These packets that comprise the address information of a recipient, are transmitted from a sender to the recipient by routing their path in the network on the basis of the recipient's address. In packet switched data transmission, the same radio resources can be divided among multiple users, as necessary.

GPRS is the GSM (Global System for Mobile communications) network's packet switched data transmission service that complements the existing services, such as conventional circuit switched data transmission and the short message service (SMS). In conventional circuit switched data transmission, the allocation of radio resources between a wireless terminal, such as a mobile station or a computer terminal, and a base station subsystem (BSS) is typically carried out by reserving a so-called physical (radio) channel for the duration of the call, where a physical channel means a specific time slot of a transfer frame on a given frequency band. GPRS, which is defined in general in the GSM recommendation 03.60, enables the dynamic allocation of physical channels for data transmission. In other words, a physical channel is being reserved for a particular MS—BSS link only when there is data to be transmitted. Thus, the unnecessary reservation of radio resources when there is no data to be transmitted is avoided.

GPRS is intended to operate in conjunction with conventional GSM circuit switched transmission to efficiently use the air interface for both data and voice communications. GPRS therefore uses the basic channel structure defined for GSM. In GSM, a given frequency band is divided in the time domain into a succession of frames, known as TDMA (Time Division Multiple Access) frames. The length of a TDMA frame is 4.615 ms. Each TDMA frame is in turn divided into eight consecutive time slots of equal duration. In the conventional circuit switched transmission mode, when a call is initiated, a physical channel is defined for that call by reserving a given time slot (1-8) in each of a succession of TDMA frames. Physical channels are similarly defined for conveying various signalling data in a network.

With taking GPRS into use in the GSM system, radio resources for data transmission are reserved by dynamically assigning physical channels either for circuit switched transmission mode or the packet switched transmission mode. When the network requirements for circuit switched transmission mode are high, a large number of time slots may be allocated to that mode. The GSM network service that offers multiple time slots for the use of the same circuit switched connection in the same TDMA frame, is called a HSCSD (high speed circuit switched data) service. On the other hand, when demand for GPRS transmission mode is high, a large number of time slots may be allocated to that transmission mode. In addition, a high-speed packet switched transmission channel may be provided by assigning two or more slots in each of a succession of TDMA frames to a single wireless terminal. A series of four consecutive time slots on a physical channel is known as one data block, and it represents the shortest packet switched data transmission unit on a physical channel.

FIG. 1 shows telecommunication network connections in a packet switched GPRS service. The main element of the network's infrastructure for GPRS services is a GPRS support node, which in packet switched data transmission corresponds to the GSM network's mobile switching center MSC, known in connection with circuit switched data transmission. GPRS support nodes are divided into serving GPRS support nodes SGSN and gateway GPRS support nodes GGSN. SGSN is a support node that transmits data packets to a wireless terminal MS (mobile station) and receives the data packets sent by the MS, through a base station sybsystem BSS that is formed of base transceiver stations BTS and base station controllers BSC. In this description, by a wireless terminal MS is meant all data terminal equipment that communicate over a specific radio interface. Thus, also a computer terminal that communicates through a mobile station coupled thereto is called a wireless terminal. SGSN also maintains together with GPRS registers (not shown in the figure) the location data of wireless terminals that move in its service area. Physically, SGSN is typically implemented as a separate network element. GGSN that communicates with SGSN implements the connection and co-operation with other networks. These other networks may be, among others, the GPRS network of some other operator or some private network, Internet network/public switched packet data network PSPDN or X.25 network.

The GPRS radio interface between a BTS and an MS is called the Um interface. Said Um interface for GSM Phase 2+ (GSM 03.64) can be modelled as a hierarchy of logical layers with specific functions. As is shown in FIG. 2, a wireless terminal (mobile station, MS) and a network have identical layers, which communicate via the Um interface between the mobile terminal and the network. It should be understood that the model shown in FIG. 2 does not necessarily represent the hardware contained by the mobile station and the network, but it rather illustrates the flow and processing of data through the system. Each layer modifies data received from the neighbouring layer. Typically, the received data passes through the logical layers from the bottom to the top layer and the data to be transmitted passes from the top to the bottom layer.

Under the application layer, in the top logical layer shown in FIG. 2, the MS has multiple packet data protocol (PDP) units. Some of these PDP units use point-to-point protocols (PTP) adapted for sending packet data from one wireless terminal to another or from a wireless terminal to a fixed terminal. Examples of PTP protocols are IP (Internet Protocol) and X.25, which are capable of establishing an interface with applications of the application layer. In the network, similar protocols with which protocols of the top layer of the mobile station communicate are typically located in a gateway GPRS support node (GGSN).

The top layer units use a subnetwork dependent convergence protocol (SNDCP, GSM 04.65), one task of which is to compress and divide, as well as compile data into SNDCP Packet Data Units. In the network, a similar SNDCP layer is typically located in a serving GPRS support node (SGSN).

The logical link control (LLC, GSM 04.64) layer provides a reliable encrypted logical connection between the MS and the SGSN. LLC frames, formed by the LLC layer, are used for conveying SNDCP packet data units (or other GPRS endpoint protocol units) over the radio interface.

The RCUMAC (radio link control/medium access control, GSM 04.60) layer provides services for transmitting information over the physical layers of the GPRS radio interface between the MS and a base station subsystem. The RLC/MAC layer comprises two different functions: RLC function comprises, among other things, procedures for segmenting LLC layer data blocks and reassembling them into RLC data blocks. The RLC function also comprises procedures for re-transmitting unsuccessfully delivered RLC blocks. The MAC function acts above the Phys. link layer and defines the procedures that enable radio resources to be allocated and divided among multiple users. The MAC function also arbitrates between wireless terminals that are trying to transmit data simultaneously, by providing collision avoidance, detection and recovery procedures. Physically, the network's RLC/MAC layer is typically located in a base station subsystem BSS, in a base station controller BSC, wherein it is typically implemented by a so-called packet control unit (PCU). It is also possible to place the PCU in a SGSN or a BTS.

The physical link layer provides a physical channel between the MS and the network. The physical RF (radio frequency) layer defines, among other things, the carrier frequencies and GSM radio channel structures, the modulation of the GSM channels and the transmitter and receiver characteristics.

When the MS has data to transmit, the RLC/MAC layer's MAC function allocates, from the network, the radio resources necessary for transmitting the data over the radio interface. Typically, in this case, a TBF (Temporary Block Flow, GSM 03.64) connection is being established, which is a temporary physical one-way connection between the MS and the network for transmitting data blocks on a physical channel over the radio path. Here, its temporary nature means that TBF is only maintained for the duration of data transmission.

There are two types of TBF connections: close ended TBF and open ended TBF. In a close ended TBF, the network allocates to the MS for the transmission of data blocks a pre-determined number of time slots in a succession of TDMA frames, depending on the number of data blocks to be transmitted. In an open ended TBF, the number of data blocks to be transmitted during the connection is typically not known to the network in advance. Therefore, in an open ended TBF, the network allocates time slots to the MS until the open ended TBF connection is released either by the network or the MS. The open ended TBF is released, for example, if the network detects that the MS has not transmitted data during a given number of frames. Unlike in the close ended TBF, in the open ended TBF, the duration of the connection is not known to the network in advance. Therefore, the network prefers to allocate closed TBF connections to the MS, because then it has better opportunities to efficiently divide radio resources among different users.

For allocating radio resources (for establishing a TBF connection), there are substantially two different alternatives (FIGS. 3a-3b): 1-phase access and 2-phase access.

In 1-phase access (GSM 04.60), the MS sends the network a packet channel request. The packet channel request is in its encoded form eight or eleven bits long, depending on the network. Among other things, a so-called Multislot Class parameter is encoded by five bits in the packet channel request, which parameter indicates how many time slots the MS is able to use at a maximum, but due to the shortness of the message, not much other data can be supplied to the network therein. In response to the packet channel request, the network typically sends the MS a specific assignment message wherein the network assigns radio resources to the MS by typically establishing a close ended TBF connection for the MS. Typically, said assignment message is a packet uplink assignment message, wherein the network assigns the radio resources to the MS for an uplink radio transmission. Among other things, the time slots during which the MS can transmit appear from the message.

In 2-phase access, the MS sends the network two messages. First, the MS sends a packet channel request, wherein it only asks the network for radio resources for the transmission of a packet resource request. After again receiving a specific assignment message from the network, the MS sends the packet resource request, which is one radio block in length. In the packet resource request, the MS may send the network a lot of information (values of different parameters) on the basis of which the network decides on the allocation of the radio resources.

In the one-bit long RLC_MODE frame (GSM 04.60), the MS may propose a specific transfer mode for the TBF connection it requested. If the bit is 1, the MS is proposing the unacknowledged RLC mode. If the bit is 0, the MS is proposing the acknowledged RLC mode. In the acknowledged transfer mode, acknowledgements are used so as to find out the error-free delivery of the RLC data blocks. The acknowledged transfer mode also provides the RLC function an opportunity to retransmit unsuccessfully transferred data blocks.

In the sixteen-bit long RLC_OCTET_COUNT field, the MS may propose the TBF connection being established to be either a close ended TBF connection of specific duration or an open ended TBF connection. However, the network may ignore the MS's proposal and decide alone what type of TBF connection will be established.

In response to the packet resource request, the network again sends the MS a specific assignment message, wherein the network assigns radio resources to the MS establishing a close or open ended TBF connection for the MS.

GPRS was initially designed for non-realtime data services, such as e-mail services. However, the pressure for using GPRS in realtime services that require a short delay, such as in the transmission of speech (voice) and a video image, is continuously increasing. In the following, by the term realtime data transmission is meant explicitly data transmission for realtime services. For realtime services, the following three requirements are set on GPRS:

use of open ended TBF short access delay short transmission delay

The use of an open ended TBF connection in realtime services is important in order to avoid, for example, constant breaks due to the establishment and release of close ended TBF connections of specific lengths, e.g. in speech transmission. However, the problem is that according to current GPRS specifications, the network can decide alone what type of TBF will be established. But, as has already been mentioned, said network prefers to allocate to the MS close ended TBF connections, because then it has better possibilities to efficiently divide radio resources between different users.

Achieving a short access delay is important because, for example, when transmitting speech the TBF connection will be cut off during a quiet period so that a new TBF connection must again be established when the silence ends. A short access delay is attained by using 1-phase access. But when using 1-phase access, obtaining an open ended TBF connection is not at all certain, because the network decides what type of TBF connection will be established at any given time.

Achieving a short transmission delay is a distinct requirement in connection with realtime services. A short transmission delay is attained by using the unacknowledged RLC mode. However, according to the current GPRS specification (GSM 04.60 version 6.4.0), the acknowledged RLC mode should be used when requesting a TBF connection with 1-phase access.

SUMMARY OF THE INVENTION

Now, a method has been invented for allocating radio resources from a network. According to the invention there is provided a method for allocating radio resources in a packet switched data transmission system, which data transmission system comprises terminals and a network, and in which method:
- terminals communicate with the network over the radio interface by using the packet transfer mode;
- a radio resource is allocated to a terminal for communication;
- for allocating the radio resource, the terminal sends a message to the network. It is characteristic of the method that in the method:
- for allocating the radio resource for the packet switched implementation of a realtime service, a first message is sent from the terminal to the network;
- said first message is received in the network;
- the network identifies said first message as a radio resource request for the packet switched implementation of a realtime service; and
- the network allocates to the terminal the requested radio resource for the packet switched implementation of the realtime service.

It is characteristic of a terminal according to the invention, which terminal comprises means for packet switched communication with a network over the radio interface, that the terminal comprises:
- means for generating and transmitting a first message to the network for allocating a radio resource for the packet switched implementation of a realtime service, which message comprises a specific information for identifying the message in the network as a radio resource request for the packet switched implementation of a realtime service.

It is characteristic of a network element, according to the invention, which network element comprises means for packet switched communication with a terminal over the radio interface that the network element comprises:
- means for receiving and identifying a message arriving from the terminal as a radio resource request for the packet switched implementation of a realtime service;
- means for allocating the radio resource to the terminal for the packet switched implementation of the realtime service.

According to the invention, for allocating radio resources for a realtime service, a wireless terminal sends a network a specific message. The network identifies the message in question as a radio resource request for a realtime service through a bit pattern comprised by the specific message, after which the network typically sends the wireless terminal a packet uplink assignment message, wherein the network assigns radio resources to the wireless terminal establishing an open ended TBF connection between the wireless terminal and the network. As the connection's RLC mode, the network sets the unacknowledged RLC mode.

BRIEF DESCRIPTION OF THE DRAWINGS

In the following, the invention will be described in detail by referring to the enclosed drawing, in which.

DETAILED DESCRIPTION

Figure 1:
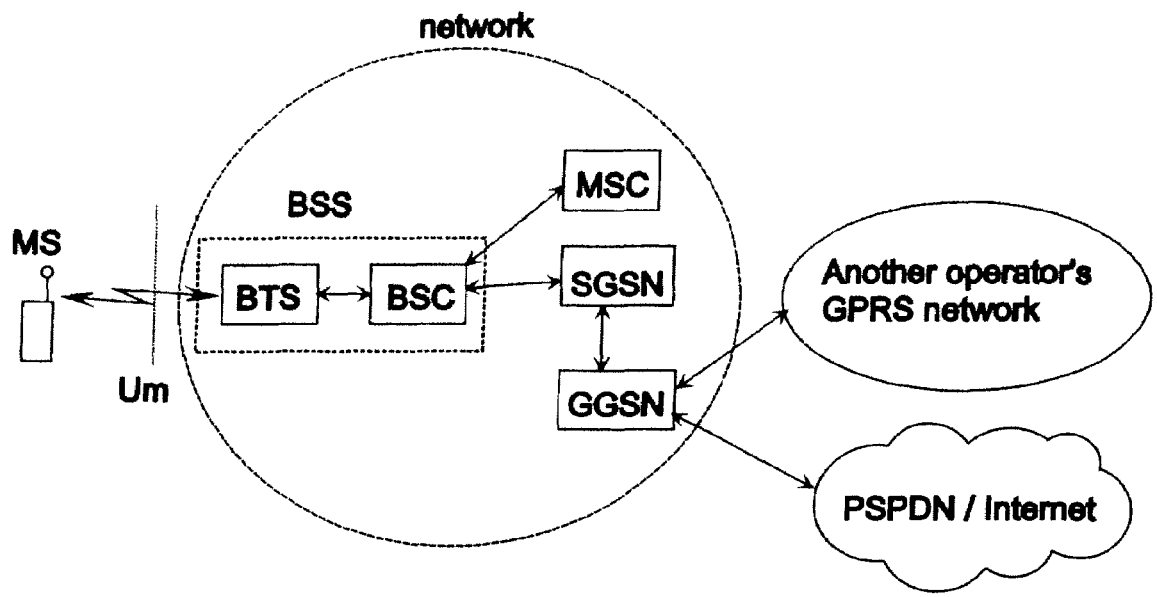
FIG. 1 shows telecommunication network connections in a packet switched GPRS service.
Figure 2:
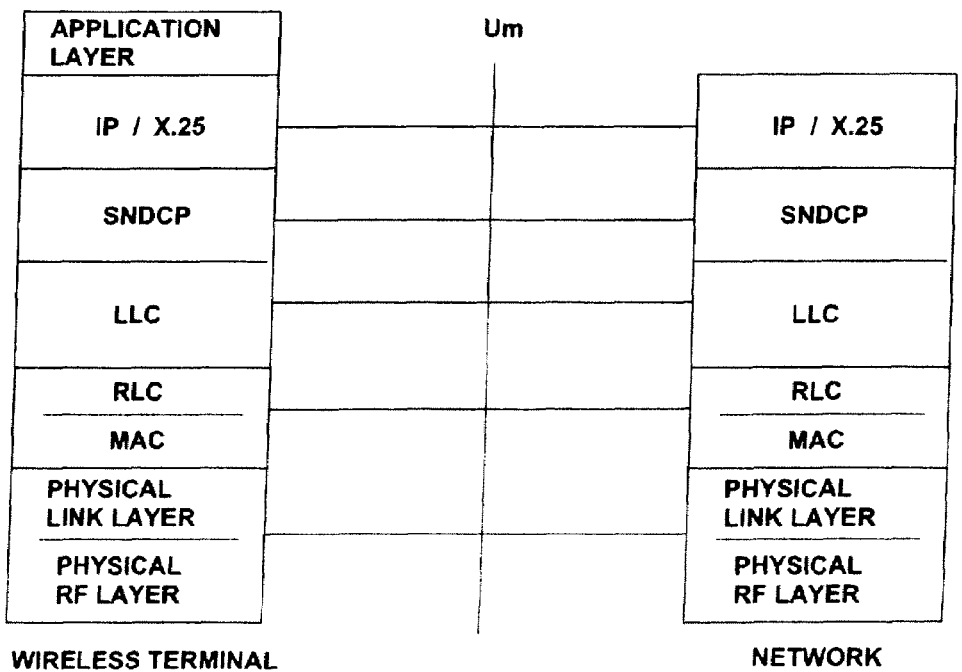
FIG. 2 shows a hierarchy of logical layers, by which the GPRS radio interface is modelled.
Figure 3A:
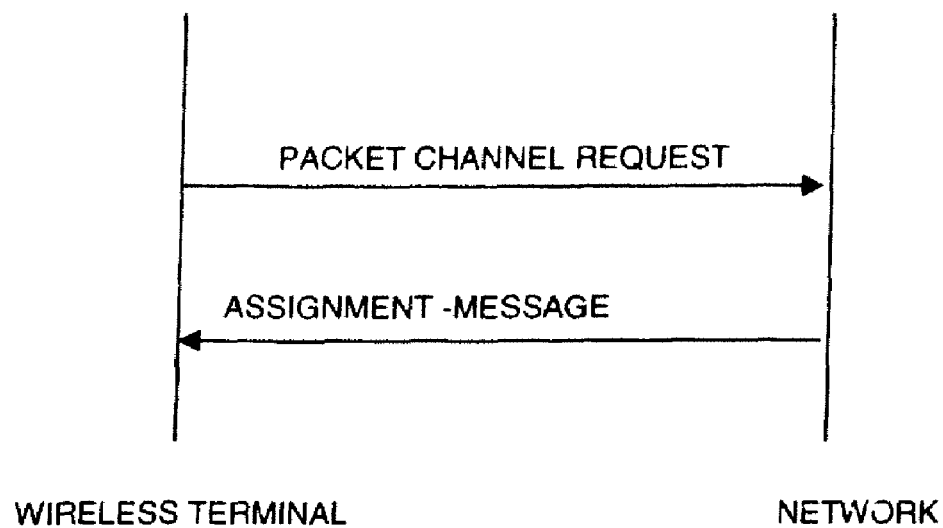
FIGS. 3a-3b show 1- and 2-phase access for allocating radio resources.
Figure 3B:
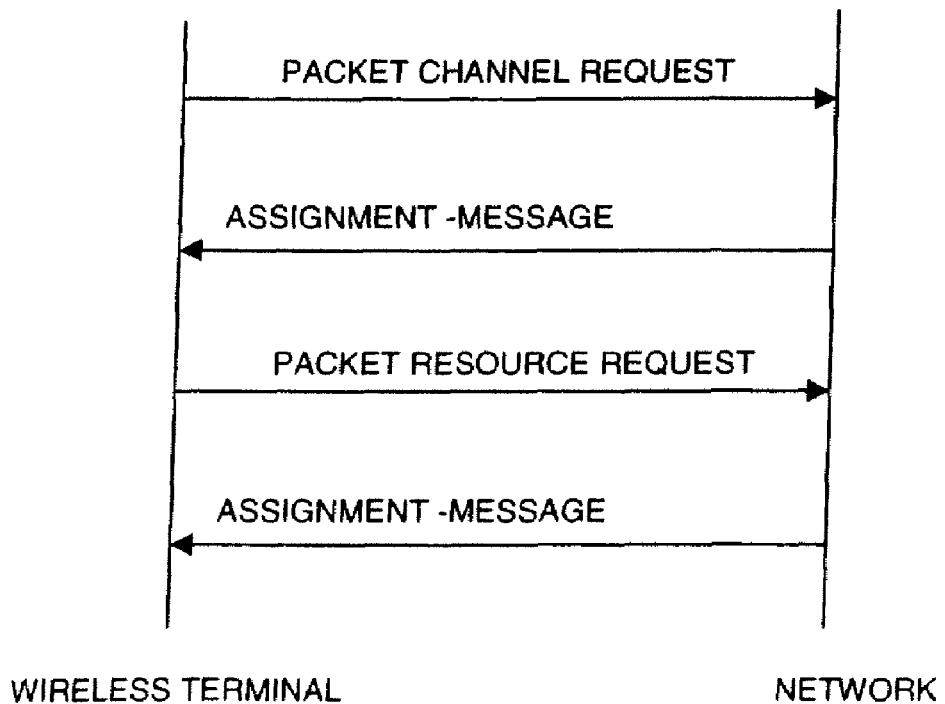

FIGS. 1, 2 and 3 are explained above in connection with the description of prior art. In the description of the first preferred embodiment according to the invention, a reference is made to FIGS. 4a and 4b. In the first embodiment of the invention, a wireless terminal uses 1-phase access for allocating radio resources for realtime data transmission, such as the transmission of speech.

According to the invention, the wireless terminal preferably sends a packet channel request on PRACH (packet random access channel). Depending on whether the system supports an eight or eleven bits long channel request, the packet channel request is eight or eleven bits long. The current GPRS specification has not defined the packet channel request with which radio resources could be allocated (TBF connection could be established) for realtime data transmission. Therefore, in the packet channel request, a new bit pattern that has not yet a meaning in the GPRS specification is now being used, which indicates to the network that the wireless terminal wants a TBF connection for realtime data transmission.

Figures 4A, 4B, 5:
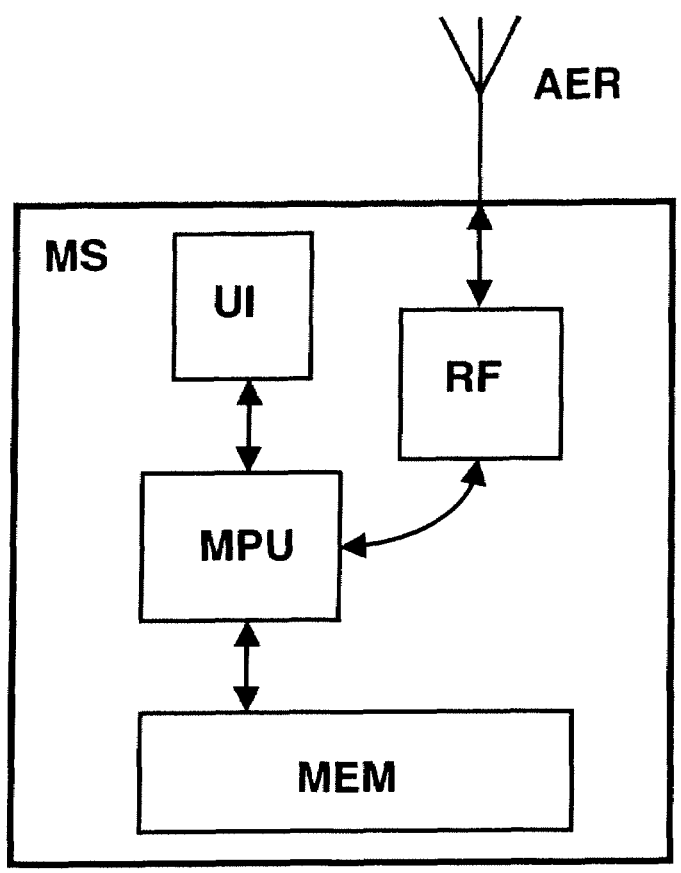
FIGS. 4a-4b show two packet channel requests according to a first embodiment of the invention.
FIG. 5 illustrates essential parts of a mobile station that implements the method according to the invention.

FIG. 4a illustrates one possible eleven-bit packet channel request according to the invention, and FIG. 4b illustrates one possible eight-bit packet channel request. Said new bit pattern in the eleven-bit packet channel request is preferably 110101 and in the eight-bit packet channel request, 01101, but the bit patterns may alternatively also be other still unused bit patterns. Bits marked with X in packet channel requests are random bits with the help of which the network can, identify the wireless terminal that sent the message, for example, when the simultaneous transmission of two or more terminals occurs.

When the network now receives the packet channel request sent by the wireless terminal, which comprises the bit pattern described in the previous chapter, the network identifies said packet channel request as of the wireless terminal's request for allocating radio resources for realtime data transmission. In this case, the network sends the wireless terminal in response to the packet channel request a specific assignment message, wherein the network assigns radio resources to the wireless terminal establishing for the wireless terminal an open ended TBF connection. Consequently, according to the invention, the network can no longer decide alone what type of TBF connection will be established, but it has to establish an open ended TBF connection. As the RLC mode, the network now sets (contrary to the current GPRS specification) the unacknowledged RLC mode. In this transfer mode, retransmissions of RLC data blocks that cause a delay are not possible by the RLC mode. Error correction of the FEC (forward error coding) type is preferably used for error correction.

Because in the first embodiment according to the invention, according to the current GPRS specification, a wireless terminal is not capable of indicating the value of a Multislot Class parameter to the network, one time slot for uplink transmission and one time slot for downlink transmission can be set as default value.

If, in the open ended TBF connection established for realtime data transmission there occurs a period during which there is no data to be transmitted, the TBF connection will be released. When there again is data to be transmitted, the wireless terminal will again use 1-phase access with a short delay for establishing a new open ended TBF connection.

If the network does not provide the GPRS' own control channels, such as PRACH, for the use of the wireless terminal, the wireless terminal will use the GSM network's standard RACH (random access channel) for transmitting the (packet) channel request. In this case, 1-phase access cannot be used, because all the bit patterns of the channel request sent on the RACH are already in use and a new bit pattern that would indicate to the network that the wireless terminal wants a TBF connection for realtime transmission can no longer be taken into use. In such a case, the wireless terminal will use 2-phase access for the allocation of radio resources for realtime data transmission, as is presented in a second preferred embodiment according to the invention.

In the second preferred embodiment of the invention, a wireless terminal uses 2-phase access for the allocation of radio resources for realtime data transmission. The wireless terminal preferably sends a channel request on the RACH, wherein it only requests the network for radio resources for transmitting a packet resource request. The network sends the wireless terminal in response to the channel request a specific assignment message, wherein the network assigns radio resources to the wireless terminal for transmitting the packet resource request. After receiving said assignment message from the network, the terminal preferably sends the network the packet resource request on the PACCH (packet associated control channel).

According to the invention, a Realtime Resource Request field, which can be one to several bits long, is added to the packet resource request. Preferably in this embodiment, the length of said field is one bit. In this case, if the bit in said field is 1, the packet resource request comprises a request for allocating radio resources for realtime data transmission. If the bit in question is 0, the packet resource request comprises a request for allocating radio resources for non-realtime data transmission. In the second preferred embodiment according to the invention, in the Realtime Resource Request field, in the packet resource request sent by the wireless terminal to the network, the bit is 1. Furthermore, the bit in the RLC_MODE field is 1, indicating that the wireless terminal proposes the unacknowledged RLC mode. In the sixteen-bit long RLC_OCTET_COUNT field, all the bits are zeros, indicating that the wireless terminal proposes the establishment of an open ended TBF connection.

When the network now receives the packet resource request sent by the wireless terminal, which comprises the bit 1 in the Realtime Resource Request field, the network identifies said packet resource request as a request of the wireless terminal for allocating radio resources for realtime data transmission. This being the case, the network sends the wireless terminal in response to the packet channel request a specific assignment message, wherein the network assigns radio resources to the wireless terminal establishing for the wireless terminal an open ended TBF connection, according to the proposal of the wireless terminal. Consequently, according to the invention, the network cannot decide alone what type of TBF connection will be established, but it must establish an open ended TBF connection. As the RLC mode, the network sets the unacknowledged RLC mode proposed by the wireless terminal.

If there later occurs a period in the TBF connection established for realtime data transmission, during which there is no data to be transmitted, the TBF connection will be released. When there again is data to be transmitted, the wireless terminal will again use 2-phase access for establishing a new open ended TBF connection.

The invention may be implemented programmably by making the necessary changes in the RLC/MAC layer both in the wireless terminal and the network. The computer program product in question can be stored in a data medium, e.g. a memory, it can be transferred and it can be run, e.g. in a computer or a mobile phone microprocessor.

FIG. 5 illustrates parts that are essential for the operation of a wireless terminal that implements the method according to the invention. The wireless terminal MS comprises a processor MPU and the parts functionally connected to the processor: a memory MEM; a user interface UI; and a radio part RF. The processor MPU is preferably a microprocessor, a microcontroller or a digital signal processor (DSP). The memory MEM preferably comprises a read only memory (ROM) and a random access memory (RAM). The radio part RF can transmit and receive messages at a radio frequency, such as packet channel requests and packet resource requests in one or more time slots of a TDMA frame, by its antenna AER. The user interface UI preferably provides the user with a display and a keyboard for using the MS. The software of the MS, also the software that supports the use of GPRS, is typically stored in the ROM. The processor MPU controls, on the basis of the software, the operation of the MS, such as the use of the RF, the displaying of messages by the UI and the reading of inputs received from the UI. The RLC/MAC layer in the MS is implemented by the MPU together with the wireless terminal software and the MEM. The MPU uses the RAM as a temporary buffer memory when processing data.

Figure 6:
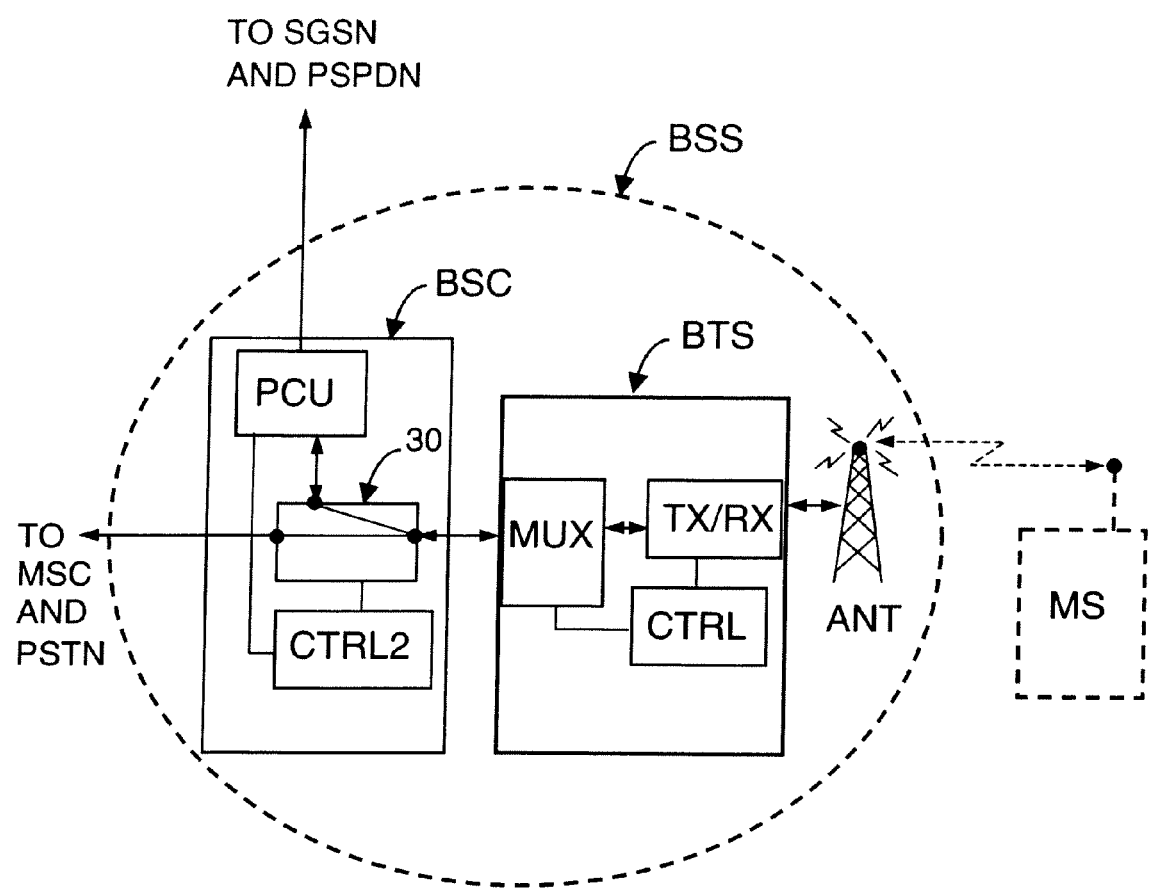
FIG. 6 illustrates the structure of a base station subsystem that implements the method according to the invention.

FIG. 6 illustrates in a simplified manner essential parts of a base station subsystem BSS that implements the method according to the invention, mainly relating to uplink packet radio transmission. The BSS comprises base transceiver stations BTS and a base station controller BSC that controls them. A base transceiver station BTS comprises transceivers TX/RX, a multiplexer MUX and a control unit CTRL that controls the operation of said transceivers and multiplexer. From the transceivers TX/RX of the BTS, there is a connection to an antenna unit ANT by which the radio connection to an MS is implemented. By the multiplexer, the traffic and control channels used by multiple transceivers TX/RX are positioned on a single transmission link that connects the BTS and the BSC.

The BSC comprises a connection field 30 and a control unit CTRL2. The connection field 30 is used, among other things, for connecting signalling circuits and for connecting speech and data to a public switched telephone network or a packet switched network. Furthermore, the BSC comprises a packet control unit PCU, the duties of which include, among other things, channel access control and radio channel management operations. It is the PCU that implements the network's RLC/MAC layer, wherefore the program changes required by the invention are made in the PCU.

Figure 7:
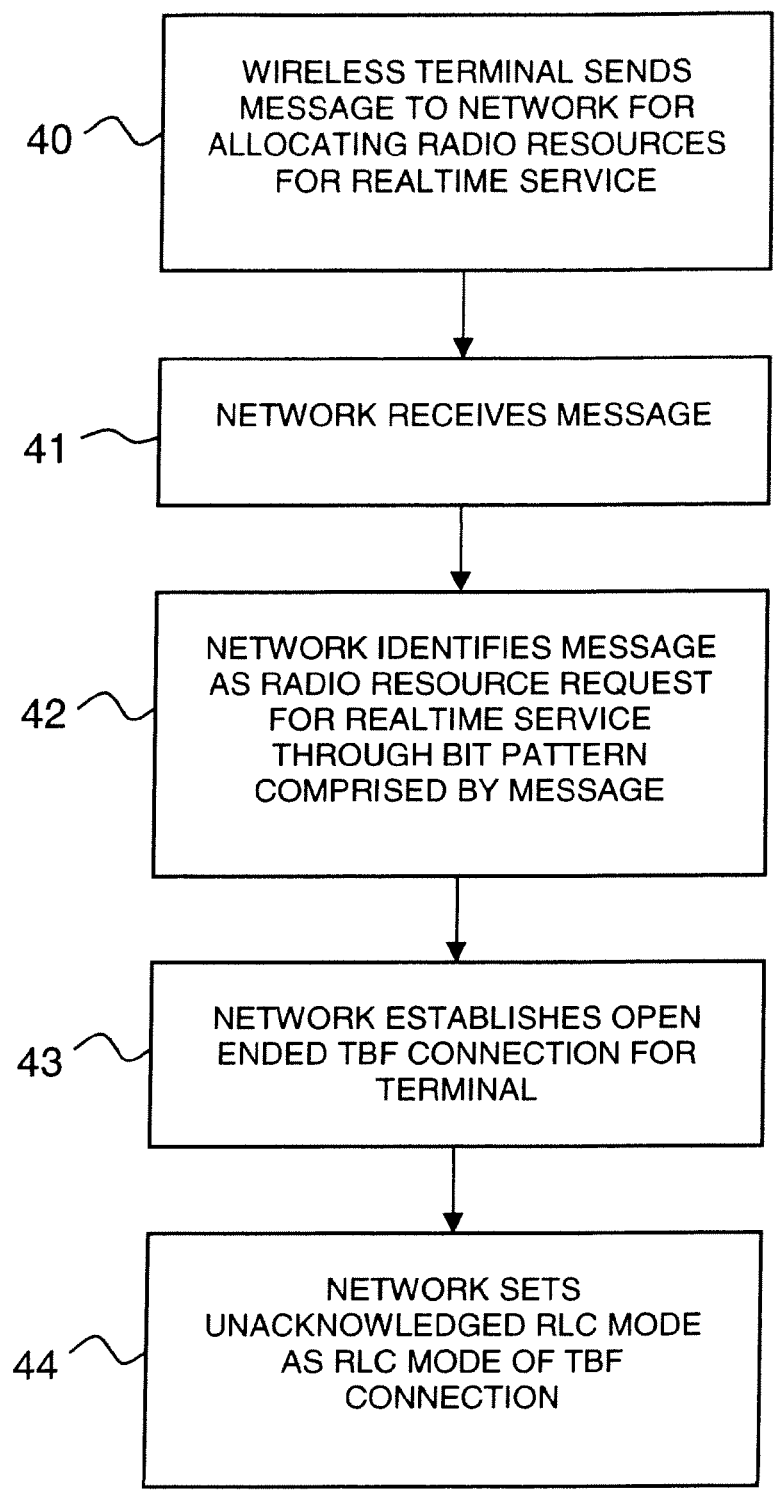
FIG. 7 is a flow diagram that shows the decision-making process according to the invention.

Furthermore, the decision-making process according to the invention is illustrated in the flow diagram in FIG. 7. First, a wireless terminal sends a network a specific message for allocating radio resources for a realtime service (Block 40). The network receives the message in question (41) and identifies the message in question as a radio resource request for a realtime service through the bit pattern comprised by the specific message (42), after which the network typically transmits to the wireless terminal a packet uplink assignment message, wherein the network assigns radio resources to the wireless terminal establishing for the MS an open ended TBF connection (43). As the connection's RLC mode, the network sets the unacknowledged RLC mode (44). In this way, the small delay required by realtime services is attained.

The essential parts of the present invention are also suitable for use in EDGE (Enhanced Data rates for GSM Evolution) and particularly in EGPRS (Enhanced GPRS) based on EDGE. EGPRS is a service built on GPRS. The invention can also be used in the future in UMTS (Universal Mobile Telecommunications System).

This paper presents the implementation and embodiments of the present invention with the help of examples. A person skilled in the art will appreciate that the present invention is not restricted to details of the embodiments presented above, and that the invention can also be implemented in another form without deviating from the characteristics of the invention. The embodiments presented above should be considered illustrative, but not restricting. Thus, the possibilities of implementing and using the invention are only restricted by the enclosed claims. Consequently, the various options of implementing the invention as determined by the claims, including the equivalent implementations, also belong to the scope of the invention.

The invention claimed is:

1. A method for allocating radio resources in a packet-switched data transmission system in two phases, in which system a terminal is capable of communicating with a network over a radio interface by using packet transfer mode, wherein the method comprises:
   generating and sending from the terminal to the network a first radio resource request for allocating a radio resource for transmission of a second radio resource request;
   generating and sending from the terminal to the network, after the network allocates the requested radio resource, the second radio resource request for allocating a radio resource to the terminal for packet-switched communication, wherein
   the second radio resource request comprises an express indication on whether the radio resource is requested for a real-time service, and wherein
   the radio resource request is implemented by a protocol layer which defines procedures that enable radio resources to be allocated and divided among multiple users.

2. A method according to claim 1, wherein said second radio resource request is sent in a message comprising a bit field of at least one bit long for identifying said second radio resource request as a radio resource request for packet-switched implementation of a real-time service.

3. A method according to claim 1, wherein said protocol layer is a radio link control/medium access control layer.

4. A method according to claim 1, wherein sending said first radio resource request comprises sending a packet channel request of a general packet radio service system, and sending said second radio resource request comprises sending a packet resource request of a general packet radio service system.

5. A method according to claim 1, wherein said second radio resource request comprises a one bit long bit field, wherein:
   a defined first value of said one bit long bit field indicates that radio resource is requested for packet-switched implementation of a real-time service; and
   a defined second value of said one bit long bit field indicates that radio resource is requested for packet-switched implementation of a non-real-time service.

6. A method for allocating radio resources in a packet-switched data transmission system in two phases, in which system a terminal is capable of communicating with a network over a radio interface by using packet transfer mode, wherein the method comprises:
   receiving at the network a first radio resource request sent by the terminal for allocating radio resource for transmission of a second radio resource request;
   allocating, by a network element, the requested radio resource to the terminal;
   receiving subsequently at the network the second radio resource request sent by the terminal for allocating radio resource to the terminal for packet-switched communication, wherein
   the second radio resource request comprises an express indication that radio resource is requested for a real-time service, and wherein
   the radio resource request is implemented by a protocol layer which defines procedures that enable radio resources to be allocated and divided among multiple users, the method further comprising:
   allocating, by a network element, the requested radio resource for packet-switched implementation of a real-time service.

7. A terminal for communication, wherein
   the terminal is configured for communication with a network over a radio interface by using packet transfer mode, the terminal comprising:
   a processor and transmitter for generating and sending from the terminal to the network a first radio resource request for allocating radio resource for transmission of a second radio resource request, wherein
   the processor and transmitter are configured to generate and send from the terminal to the network, after the network allocates the requested radio resource, the second radio resource request for allocating radio resource to the terminal for packet-switched communication, wherein the terminal further comprises:
   a protocol layer for defining procedures that enable radio resources to be allocated and divided among multiple users, the protocol layer being configured to implement said radio resource requests, wherein the terminal is configured to include into the second radio resource request an express indication on whether radio resource is requested for a real-time service.

8. A terminal according to claim 7, wherein the terminal is configured to send said second radio resource request in a message comprising a bit field of at least one bit long for identifying said second radio resource request as a radio resource request for packet-switched implementation of a real-time service.

9. A terminal according to claim 7, wherein said protocol layer is a radio link control/medium access control layer.

10. A terminal according to claim 7, wherein said first radio resource request comprises a packet channel request of a general packet radio service system, and said second radio resource request comprises a packet resource request of a general packet radio service system.

11. A terminal according to claim 7, wherein said second radio resource request comprises a one bit long bit field, wherein:

a defined first value of said one bit long bit field indicates that radio resource is requested for packet-switched implementation of a real-time service; and a defined second value of said one bit long bit field indicates that radio resource is requested for packet-switched implementation of a non-real-time service.

12. A terminal according to claim 7, wherein said terminal is one of the following: a mobile terminal of a cellular network or a computer terminal that is configured to communicate via a mobile terminal of a cellular network.

13. A terminal according to claim 7, wherein the real-time service is selected from a group consisting of: transmission of speech, transmission of video image.

14. An apparatus for allocating radio resources in a packet-switched data transmission system in two phases, in which system a terminal is capable of communicating with a network over a radio interface by using packet transfer mode, wherein the apparatus comprises:

a receiver for receiving at the network a first radio resource request sent by the terminal for allocating radio resource for transmission of a second radio resource request;

a control unit for allocating the requested radio resource to the terminal, wherein the apparatus is configured to subsequently receive at the network the second radio resource request sent by the terminal for allocating radio resource to the terminal for packet-switched communication, wherein the second radio resource request comprises an express indication that radio resource is requested for a real-time service, wherein the apparatus is configured to allocate the requested radio resource for packet-switched implementation of a real-time service, wherein the radio resource request is implemented by a protocol layer which defines procedures that enable radio resources to be allocated and divided among multiple users.

15. An apparatus according to claim 14, wherein said apparatus comprises said protocol layer and is configured to identify said radio resource request as a radio resource request for packet-switched implementation of a real-time service and to allocate the requested radio resource.

* * * * *